(12) United States Patent
Hoffmann et al.

(10) Patent No.: US 6,541,108 B1
(45) Date of Patent: Apr. 1, 2003

(54) PROCESS FOR THE PREPARATION, PREFERABLY FROM WASTE MATERIALS, OF SILICATE FOAM WITH CLOSED PORES, AND THE PRODUCT PRODUCED BY THE PROCESS

(76) Inventors: László Hoffmann, Nádor u. 27, H-1029 Budapest (HU); István Jalsowszky, Baja u. 12/a, H-1164 Budapest (HU); Emma Hoffmann, Celli u. 39/b, H-8500 Pápa (HU); Rita Rostás, Baja u.12/a, H-1164 Budapest (HU); Jenó Fehér, Damjanich u. 31/b, H-1071 Budapest (HU); Zsolt Fejér, Csillag ltp. 16, H-2900 Komárom (HU)

( * ) Notice: Subject to any disclaimer, the term of this patent is extended or adjusted under 35 U.S.C. 154(b) by 0 days.

(21) Appl. No.: 09/600,063

(22) PCT Filed: Mar. 5, 1999

(86) PCT No.: PCT/HU99/00017
§ 371 (c)(1),
(2), (4) Date: Jul. 10, 2000

(87) PCT Pub. No.: WO00/29345
PCT Pub. Date: May 25, 2000

(30) Foreign Application Priority Data

Nov. 12, 1998 (HU) .............................................. 9802622

(51) Int. Cl.$^7$ .............................. B32B 3/00; B32B 3/26
(52) U.S. Cl. ............................... 428/312.6; 428/312.2; 428/314.4; 428/318.4; 428/319.3; 501/80; 501/85; 106/601; 106/602; 106/604; 106/605; 106/672; 106/676

(58) Field of Search ........................... 428/312.2, 312.6, 428/314.4, 318.4, 319.3; 501/80, 85; 106/601, 602, 604, 605, 672, 676

(56) References Cited

U.S. PATENT DOCUMENTS 3,874,861 A * 4/1975 Kurz .............................. 65/20

FOREIGN PATENT DOCUMENTS

HU 211028 * 12/1995
SU 1335544 * 7/1987

* cited by examiner

Primary Examiner—Terrel Morris
Assistant Examiner—Leanna Roché
(74) Attorney, Agent, or Firm—Susan J. Friedman

(57) ABSTRACT

The process of the invention characterized in that to 100 parts by weight of a silicate powder having 2000–8000 m$^2$/g specific surface, 1–10 parts by weight of gas-forming material with particle size of 10–100 μm and 0.5–15 parts by weight of montmorillonite, 0.5–2 parts by weight of alkali hydrogen phosphate or alkali dihydrogen phosphate or a mixture of alkali metal phosphate and sodium silicate in form of aqueous solution, 0.01–5 parts by weight of rare earth metal oxide or a mixture of such oxides were added, then the mixture obtained is homogenized, pre-dried, coated with 1–5 parts by weight of titanium oxide and/or titanium oxide hydroxide and/or aluminum oxide hydroxide, then subjected to heat treatment at 720–1000° C., and the mixture obtained is molded. The subject of the invention: also the product of the above process.

22 Claims, No Drawings

PROCESS FOR THE PREPARATION, PREFERABLY FROM WASTE MATERIALS, OF SILICATE FOAM WITH CLOSED PORES, AND THE PRODUCT PRODUCED BY THE PROCESS

BACKGROUND OF THE INVENTION

1. Technical Field of the Invention

The invention relates to a process for the preparation, preferably from waste materials, of silicate foam having with closed pores and the product produced by the process.

By the process according to the present invention silicate foam granules are produced, which can be used alone or together with inorganic or organic binding material for manufacturing of sheets or articles of desired shape.

The product according to the invention is of low specific weight, flame-proof and has excellent thermal insulating, sound-proofing and anti-vibration properties.

2. Description of the Related Art

Several processes are known for the preparation, of glass foams.

In the Hungarian patent No. 171 046 is disclosed a process for the manufacture of foamy product from ground waste glass. According to said process the waste glass is mixed with powdered alkali metal hydroxides, phosphoric acid and/or silicone fluoride as melting point lowering additives, and the foaming is carried out in the presence of a gas-forming material at a temperature of 600–850° C.

According to the process disclosed in the U.S. Pat. No. 4,413,907 glass powder, additives and water are mixed, then in a furnace at high temperature foamy product is manufactured.

The U.S. Pat. No. 4,734,322 relates to a process characterised by adding a mixture of calcium carbonate and magnesium carbonate to glass powder, then from the mixture obtained foamy product is manufactured at a temperature of 700–800° C.

The Japanese patent publication No. 03 13 7038 concerns a process for the production of glass foam; according to said process the starting glass powder is mixed with 1–5% by weight of strontium carbonate and from this mixture thermal insulating glass foam is produced.

The disadvantage of the processes mentioned above is that only a small part of the glass foam granules produced by them have closed pores, and therefor their strength properties are not satisfactory, they can not be used as anti-vibration materials.

SUMMARY OF THE INVENTION

Our aim was to work out a process by which the disadvantages of the above mentioned processes can be eliminated and silicate foam product can be manufactured with closed pore structure and high strength.

As suitable starting material waste glass powder, ground enamel frit, waste moulding sand, waste ceramic, silicate waste from the manufacture of electric bulb or fluorescent lamp or other organic or inorganic silicate waste are used, but original glass powder or ground silicate can also be applied.

Accordingly, the present invention relates to a process for the preparation, preferably from waste materials, of silicate foam having closed pores by mixing silicate powder, gas-forming material, alkaline solution, optionally wetting the mixture with water, then homogenising, granulating and subjecting to heat treatment the mixture obtained.

DETAILED DESCRIPTION OF THE INVENTION

The process characterised in that to 100 parts by weight of silicate powder, preferably waste glass powder, waste enamel frit, waste moulding sand, waste ceramic, organic or inorganic silicate waste or a mixture thereof having a specific surface of 2000–8000 $cm^2/g$ 1–10 parts by weight of gas forming material of particle size 10–100 $\mu$m, preferably ground limestone and/or dolomite and/or magnesite and/or witherite is added, the mixture is homogenised and then 0.5–15 parts by weight of montmorillonite optionally activated with a 1–10% by weight solution of alkali metal hydroxide or metal carbonate, and/or serpentine and/or alumina and/or aluminium oxide hydroxide, optionally 0.2–3 parts by weight of alkali metal hydroxide or metal carbonate in form of 1–10% by weight solution, further 0.5–2 parts by weight of alkali hydrogen phosphate or alkali dihydrogen phosphate or a mixture of alkali metal phosphate and sodium silicate in form of aqueous solution, as well as 0.01–5 parts by weight of a rare earth metal oxide or a mixture of such oxides, optionally 0.1–5 parts by weight of a coloured metal oxide or a mixture of such oxides or a heavy metal oxide or a mixture of such oxides are added, then the mixture obtained this way is homogenised, if desired wetted with water and granulated, then pre-dried, the granules are coated with 1–5 parts by weight of titanium dioxide and/or titanium oxide hydroxide and/or aluminium oxide hydroxide, then subjected to heat treatment at a temperature of 720–1000° C., optionally the granules obtained are coated with 0.1–1% by weight of polymer film or optionally 90–50 parts by weight of granules are mixed with 10–50 parts by weight of organic or inorganic binding material and shaped to the desired form.

A further object of the invention is a granulated silicate foam manufactured by the above process and having 0.4–0.45 $g/cm^3$ bulk weight and closed pores, which optionally contains 0.1–2% by weight of polymer film on the surface or a shaped article containing 90–50 parts by weight of silicate foam granules having closed pores and manufactured by the above process and 10–50 parts by weight of organic or inorganic binding material.

The shaped article can be a sheet or a building block of desired shape.

The role of the rare earth metal oxide or the mixture of such oxides used in the process according to the invention is to adjust the optimal surface tension of the mixture and to induce a quick crystallisation process in the material. This way the strength of the granules formed is surprisingly increased.

The addition of titanium dioxide or titanium oxide hydroxide before the beat treatment prevents the adhesion of the granules.

By using coloured metal oxide or a mixture of such oxides as well as heavy metal oxide or a mixture of such oxides in the process according to the invention, granules of desired colour can be produced.

The witherite optionally used in the process is a mineral based on barium carbonate.

In the process as alkali solution the aqueous extract of the ash of sunflower seed shell can also be used.

The activation of montmorillonite and/or serpentine-like minerals can be carried out either before mixing or in situ, when mixing it/them with the silicate powder.

If desired the surface of the granules can be coated by thermoplastic or thermosetting polymer film. When the granules are mixed with binding material, shaped articles can be manufactured from the mixture.

As binding material cement, gypsum, bitumen, thermoplastic polymers or thermosetting synthetic resins can be applied.

The process and the product according to the invention have the following advantages:

- The process provides the production of silicate foam granules which have closed pores, more homogenous particle size than that produced by the known processes, and improved strength properties.
- By the process not only waste glass but other waste silicate can be worked up to a product with thermal insulating and soundproofing properties.
- The product obtained by this process is an excellent anti-vibration material.
- By the process according to the invention not only waste materials but original glass powders and silicate powders can be worked up to silicate foam with closed pores.

The process according to the invention is illustrated by the following examples.

EXAMPLE 1

100 parts by weight of lead glass waste powder of 4000 cm$^2$/g specific surface was mixed with montmorillonite pre-treated with sodium hydroxide solution and to the mixture 5 parts by weight of ground dolomite having a particle size of 50–70 μm were added.

The mixture was then homogenised by grinding the components together in a ball mill.

The pre-treatment of the montmorillonite was carried out by grinding together 2 parts by weight of sodium hydroxide, 18 parts by weight of water and 8 parts by weight of montmorillonite in a ball mill.

In a desintegrator to the homogenised mixture containing the lead glass waste 2 parts by weight of alkali hydrogen phosphate, 18 parts by weight of water and 0.2 parts by weight of a mixture of rare earth metal oxides (consisting of lanthanum, cerium and europium oxides) were added.

The wet mixture was granulated and pre-dried at 120° C.

In a desintegrator the granules were mixed with 4 parts by weight of titanium dioxide.

The coated granules were heated for 2 minutes at 720° C. in a furnace, then allowed to cool at ambient temperature.

The granulated product had closed pores, a bulk density of 0.35 g/cm$^3$, a water absorbing capacity of 0.9% by weight.

EXAMPLE 2

The process described in Example 1 was followed with the exception that as starting material dried sludge was used formed at polishing cut glass, and this mixture was homogenised with ground limestone instead of ground dolomite.

To the above mixture 4 parts by weight of montmorillonite were added and ground together with 2.5 parts by weight of ash obtained by incineration of sunflower seed shell.

The mixture obtained this way was homogenised by grinding, then treated as described in Example 1, but instead of titanium dioxide titanium oxide hydroxide was used.

The granulated product with closed pores had a water absorbing capacity or 1.5% by weight, a bulk density of 0.32 g/cm$^3$.

EXAMPLE 3

Mixed waste glass (communal waste glass of green, white, and brown colour) was ground and homogenised according to Example 1 together with 2.5 parts by weight of ground limestone, 2.5 parts by weight of dried barium sulphate (waste sludge), 20 parts by weight of water, 10.0 parts by weight of alumina and 8 parts by weight of mould waste, then to the above mixture 1 part by weight of sodium hydroxide, 20 parts by weight of water, 2 parts by weight of a mixture of rare earth metal oxides according to Example 1 and the mixture of 0.5 part by weight of trisodium phosphate and 1.5 parts by weight of sodium silicate in form of 5% by weight aqueous solution were added. The mixture was homogenised, then granulated and dried at 130° C.

Thereafter 2 parts by weight of titanium dioxide were added, and the mixture was heated for 2 minutes at 820° C. in a furnace. Then the temperature was increased to 950° C., the granules were kept for 1 minute at this temperature, removed from the furnace and cooled to roomtemperature in air.

The product had a water absorbing capacity of 1.0% by weight, and a bulk density of 0.30 g/cm$^3$.

EXAMPLE 4

To 100 parts by weight of mixed communal waste glass powder 8 parts by weight of dolomite, 3 parts by weight of enriched magnesium serpentine mineral and 5 parts by weight of zinc carbonate were added. The zinc carbonate was used as a 5% by weight aqueous solution.

The mixture was ground in ball mill, homogenised, and then the process described in Example 3 was followed with the exception, that the heat treatment was carried out at 780° C. for 2.5 minutes. After this the product was cooled to roomtemperature.

The product had closed pores, a bulk density of 0.35 g/cm$^3$, and a water absorption capacity of 1.2% by weight.

EXAMPLE 5

To 100 parts by weight of powder obtained from mixed communal waste glass 5 parts by weight of ground limestone, 0.7 part by weight of montmorillonite, 3 parts by weight of zinc carbonate and 1 part by weight of a mixture of rare earth metal oxides according to Example 1 were added. The zinc carbonate was used as a 10% by weight aqueous solution.

The mixture was ground and homogenised.

Before granulation 2 parts by weight of a 1:1 mixture of sodium phosphate and disodium hydrogen phosphate were added in form of 5% by weight aqueous solution.

After sizing the granules having a suitable particle size of 3–6 mm were pre-dried at 120° C., and by mixing them with 4 parts by weight of a 1:1 mixture of aluminium oxide hydroxide and titanium dioxide a 10 μ thick coating was formed on the surface of the granules.

Then the granules were kept at 850° C. for 3 minutes, and cooled.

The product had a bulk density of 0.30 g/cm$^3$ and a water absorption capacity of 0.8% by weight.

EXAMPLE 6

To 100 parts of ground waste of fluorescent lamp production (mixed magnesium, lead and borosilicate glass) 6 parts by weight of ground limestone, 8 parts by weight of montmorillonite and 1 part by weight of a mixture of rare earth metal oxides according to Example 1 were added.

The mixture obtained was ground in ball mill to obtain a powder of 3500 cm$^2$/g specific surface, and homogenised.

Then 2 parts by weight of a 2:1 mixture of sodium silicate and trisodium phosphate were added in form of 5% by weight aqueous solution.

The wet mixture was granulated, the granules were pre-dried at 120° C., then coated with 4 parts by weight of a 1:1:1 mixture of titanium dioxide, titanium oxide hydroxide and aluminium oxide hydroxide.

Thereafter the granules were kept at 850° C. for 3 minutes, and cooled to room temperature.

The product obtained this way had a bulk density of 0.38 g/cm$^3$ and a water absorbing capacity of 0.5% by weight.

EXAMPLE 7

To 100 parts by weight of powdered borosilicate waste glass 8 parts by weight of dolomite, 5 parts by weight of montmorillonite, 0.5 part by weight of a mixture of rare earth metal oxides according to Example 1 and 5 parts by weight of waste zinc carbonate were added. The zinc carbonate was used as 10% by weight aqueous solution.

The mixture was ground and homogenised in ball mill. The granulation was carried out with the wetting solution described in Example 6. After sizing the granules of suitable size (3–5 mm) were coated with a layer of several 10$\mu$ thickness by using the materials described in Example 5.

Then the granules were dried at 120° C., subjected to heat treatment at 790° C. The product obtained had closed pores, a volume density of 0.32 g/cm$^3$ and a water absorbing capacity of 1.2% by weight.

EXAMPLE 8

To 100 parts by weight of a mixture of magnesium glass and borosilicate glass 8 parts by weight of dolomite, 3 parts by weight of montmorillonite, 3 parts by weight of alumina, 1 part by weight of a mixture of rare earth metal oxides according to Example 1 and 2 parts by weight of a mixture of waste ethyl silicate and colloidal silica were added.

The mixture was ground in ball mill, homogenised and granulated by using the wetting material described in Example 6.

The granules were dried at 120° C., coated as described in Example 6, then subjected to heat treatment at 750° C. for 4 minutes. After the heat treatment the granules was cooled to roomtemperature.

The product obtained this way had a bulk density of 0.28 g/cm$^3$ and a water absorbing capacity of 1.6% by weight.

EXAMPLE 9

The process described in Example 8 was followed with the exception that before the homogenization 3 parts by weight of a mixture of manganese, copper and chromium oxide were added as colouring material.

The product had a bulk density of 0.28 g/cm$^3$ and a water absorbing capacity of 1.6% by weight.

EXAMPLE 10

The process described in Example 8 was followed, but to prevent water absorption the granules were coated electrostatically by epoxy resin waste, then subjected to heat treatment at 140° C. for 10 minutes.

The product obtained had a bulk density of 0.32 g/cm$^3$ and a water absorbing capacity of 1.0% by weight.

EXAMPLE 11

70 parts by weight of the granules obtained in Example 1 were mixed with 30 parts by weight of gypsum and water.

The mass was placed in a mould and dried.

The sheet produced this way had excellent thermal insulating and soundproofing properties.

EXAMPLE 12

80 parts by weight of granules obtained in Example 1 were mixed with 20 parts by weight of polyester resin, then the mass was placed in a mould and hardened at 120° C. The building block produced had good thermal insulating and sound proofing properties.

What we claim is:

1. A process for the production of silicate foam—granules—having closed pores, comprising: forming a mixture of a silicate powder, a gas-forming material, an alkaline solution, a rare earth metal oxide, and a material selected from the group consisting of: montmorillonite; serpentine; alumina; aluminum oxide hydroxide; and combinations thereof; homogenizing and granulating said mixture to form granules; coating said granules with a metal oxide material to form coated granules; and heating said coated granules thereby forming silicate foam granules.

2. A process according to claim 1, wherein the silicate foam granules have surfaces and said surfaces are coated with an epoxy resin.

3. The process according to claim 1, wherein said silicate powder has a specific surface of 2000 to 8000 cm$^2$/g.

4. The process according to claim 1, wherein at least a portion of said silicate powder is derived from waste materials, and wherein said waste materials are selected from the group consisting of: glass scraps, enamel frit waste, molding sand waste; ceramic waste, organic silicate waste; inorganic silicate waste; and combinations thereof.

5. The process according to claim 1, wherein said gas-forming material has a particle size of 10 to 100 $\mu$m.

6. The process according to claim 1, wherein said gas-forming material is selected from the group consisting of: ground limestone; dolomite; magnesite; witherite; and combinations thereof.

7. The process according to claim 1, wherein said material selected from the group consisting of: montmorillonite, serpentine, or a combination thereof is in a pre-activated state.

8. The process according to claim 1, wherein said material selected from the group consisting of: montmorillonite, serpentine, or a combination thereof is in a non-activated state and is introduced together with 0.2 to 5 parts by weight of alkali metal hydroxide or metal carbonate in the form of a 1 to 10% by weight solution.

9. The process according to claim 1, wherein said alkaline solution comprises hydrogen phosphate or alkali dihydrogen phosphate, or a mixture of alkali metal phosphate and sodium silicate in the form of an aqueous solution.

10. The process according to claim 1, wherein said rare earth metal oxide is selected from the group consisting of: lanthanum; cerium; europium oxide and combinations thereof.

11. The process according to claim 1, wherein said rare earth metal oxide is added to the mixture in an amount of 0.1 to 5 parts by weight.

12. The process according to claim 1, further comprising the step of adding 0.1 to 5 parts by weight of one or more colored metal oxides or a heavy metal oxides, alone or in combination, to the mixture prior to homogenization.

13. The process according to claim 1, further comprising the step of wetting the mixture following homogenization.

14. The process according to claim 1, wherein said metal oxide material is selected from the group consisting of: titanium oxide; titanium oxide hydroxide; aluminum oxide hydroxide; and combinations thereof.

15. The process according to claim 1, wherein said heating is from 720 to 1000° C.

16. The process according to claim 1, further comprising the step of coating said—silicate foam—granules with a film comprising a polymer or synthetic resin.

17. The process according to claim 1, further comprising the step of adding one or more organic or inorganic binding materials to said silicate foam granules.

18. A process according to claim 17, wherein said binding materials comprise cement, gypsum, bitumen, thermoplastic polymers or thermosetting resins.

19. The process according to claim 17, further comprising the step of molding said silicate foam granules into any desired configuration.

20. A silicate foam product with closed pores produced by the process according to claim 1.

21. The silicate foam product according to claim 20, having a bulk weight of 0.3–0.45 g/cm$^3$.

22. The silicate foam product according to claim 20, wherein said—silicate foam—granules are surface coated with 0.1 to 2 parts by weight of a polymer or synthetic resin.

* * * * *